US005441562A

United States Patent [19]

Broich et al.

[11] Patent Number: 5,441,562

[45] Date of Patent: Aug. 15, 1995

[54] WATER-CONTAINING ADHESIVE

[75] Inventors: Ludwig Broich, Duesseldorf; Bernhard Herlfterkamp, Bottrop; Hermann Onusseit, Haan, all of Germany

[73] Assignee: Henkel Kommanditgesellschaft aug Aktien, Duesseldorf, Germany

[21] Appl. No.: 190,133

[22] PCT Filed: Jul. 29, 1992

[86] PCT No.: PCT/EP92/01721

§ 371 Date: Feb. 3, 1994

§ 102(e) Date: Feb. 3, 1994

[87] PCT Pub. No.: WO93/03111

PCT Pub. Date: Feb. 18, 1993

[30] Foreign Application Priority Data

Aug. 7, 1991 [DE] Germany ........................ 41 26 074.0

[51] Int. Cl.[6] ............................................... C08L 89/00

[52] U.S. Cl. .................................... 106/144; 106/146; 156/60; 156/326

[58] Field of Search ........................ 106/237, 144, 146; 156/60, 326

[56] References Cited

U.S. PATENT DOCUMENTS

| | | | |
|---|---|---|---|
| 2,357,073 | 8/1944 | Billing et al. | 106/144 |
| 2,361,302 | 10/1944 | Little | 106/144 |
| 2,566,529 | 9/1951 | Montgomerie | 106/144 |
| 2,651,580 | 9/1953 | Reilly | 106/144 |
| 2,943,071 | 6/1960 | Laden | 260/27 |
| 3,692,713 | 9/1972 | Columbus et al. | 260/17.4 |
| 4,013,479 | 3/1977 | Biddle et al. | 106/144 |
| 4,253,999 | 3/1981 | Okishi | 106/14.5 |
| 4,348,954 | 9/1982 | Okishi | 106/2 |
| 4,364,837 | 12/1982 | Pader | 252/173 |
| 4,464,202 | 8/1984 | Andres et al. | 106/139 |
| 4,996,135 | 2/1991 | Toyama et al. | 106/2 |
| 5,201,944 | 4/1993 | Nakata et al. | 106/144 |

FOREIGN PATENT DOCUMENTS

| | | | |
|---|---|---|---|
| 3146364 | 6/1983 | Germany . | |
| 4000241 | 7/1991 | Germany . | |
| 62-167377 | 7/1987 | Japan | 106/144 |
| 531084 | 12/1940 | United Kingdom | 106/144 |

OTHER PUBLICATIONS

U. Dullinger "Labelling Technique from A to Z (Part 2)" in Zeitschrift für Lebensmitteltechnik (7FL) 1987, pp. 503–507 (no month).

*Primary Examiner*—Anthony Green

*Attorney, Agent, or Firm*—Wayne C. Jaeschke; John D. Wood; Daniel S. Ortiz

[57] ABSTRACT

An adhesive based on glues, resins, and an alcohol is provided. The adhesive develops strengths similar to synthetic resin dispersions in the bonding of paper to plastic surfaces and has a high wet adhesive strength. The adhesive is particularly useful in the labelling of plastic surfaces particularly plastics such as polystyrene, polycarbonate, polyvinyl chloride, and polyethylene terephthalate.

19 Claims, No Drawings

WATER-CONTAINING ADHESIVE

BACKGROUND OF THE INVENTION

1. Field of the Invention

This invention relates to a water-containing adhesive based on glue and resin and to its use for bonding paper to plastic surfaces.

2. Discussion of Related Art

Glues are aqueous colloidal solutions of a) animal polymers, for example casein and glutin, or polymers from skins, bones or fish,
b) vegetable polymers, for example gum arabic, cellulose nitrate, carboxymethyl cellulose and cellulose ethers, dextrin and starch,
c) synthetic polymers, such as polyvinyl pyrrolidone, polyacrylic acid derivatives and polyvinyl alcohol.

Glues belong to the class of one-component, physically cold- or hot-setting adhesives in which the water escapes during the bonding process. Accordingly, they are mainly used for bonding absorbent materials, such as paper, cardboard or wood, to one another. However, glues are not suitable for permanently bonding paper, particularly paper labels, to plastic surfaces (see K. Dullinger "Etikettiertechnik von A bis Z" in Zeitschrift für Lebensmitteltechnik (ZFL) 1987, pages 503 to 507).

It is also known that synthetic resin dispersions can be added to glues, for example starch and dextrin glues, to improve their resistance to water. Synthetic resin dispersions, for example polyvinyl esters and polyacrylates and also copolymers thereof, are also used either on their own or together with polyvinyl alcohol for bonding paper to plastic. The object of adding polyvinyl alcohol is to increase the wet adhesive strength of the dispersion. Fully synthetic systems such as these are eminently suitable for bonding paper to plastic surfaces (see Dullinger, loc. cit.). However, they are attended by the disadvantage that high wet adhesive strength can only be achieved by adding relatively large quantities of PVAC which, at the same time, distinctly reduces adhesion to plastic surfaces.

DE 40 00 241 A1 describes an adhesive of animal glue, glue hydrolyzate or acid casein and at least one substance from the group consisting of urea, thiourea, N-alkyl urea and guanidine nitrate and optionally other additives typically used in glue production. Gum rosin, sugar or dextrin may be added to improve the non-curl properties. Glycerol or polyglycol, for example, may be added as a hygroscopic substance. The adhesive may be used in the form of an aqueous solution or solid. The document in question claims the use of the adhesive as a heat-sealing material or hot adhesive, more particularly for surface coating.

Accordingly, the problem addressed by the present invention was to provide an adhesive which, similarly to glues, would be largely based on natural raw materials, but which would develop similar strengths to synthetic resin dispersions in the bonding of paper to plastic surfaces and would have a high wet adhesive strength.

SUMMARY OF THE INVENTION

The solution to this problem as provided by the present invention is defined in the claims and resides principally in the combination of A) a glue,
B) a rosin, a synthetic resin and/or a derivative thereof and
C) a monohydric or polyhydric alcohol.

DETAILED DESCRIPTION OF THE INVENTION

Although the glues may also be based on synthetic polymers, for example polyvinyl alcohol, glues of one or more constituents from the following group are preferred: casein, starch, starch derivatives, dextrin and cellulose ethers. A suitable casein is, above all, the casein obtained from milk by precipitation with an acid. Suitable starch derivatives are those obtainable by reaction of native or degraded starch, for example oxidatively degraded starch. These starch derivatives are generally reaction products with, for example, ethylene oxide, propylene oxide, acrylonitrile, chloroacetic acid or even epoxypropane sulfonic acid. The degree of substitution should be relatively low, for example between 0.02 and 0.1 DS. The dextrin used may be a commercial thin-, medium- or thick-boiling dextrin which may be obtained in known manner by degradation of starch.

The rosin is a glass-like amorphous material with an average molecular weight below 2,000 g/mole. It is obtained from the crude rosin of conifers and consists predominantly of unsaturated carboxylic acids with the empirical formula $C_{20}H_{30}O_2$, such as abietic acid and isomers thereof. However, more or less neutral substances, such as fatty acid esters, terpene alcohols and hydrocarbons, may also be present. A derivatized rosin, for example a hydrogenated or disproportionated rosin, is preferably used, the object of the derivatization being above all to increase solubility in water, for example by saponification or addition of maleic acid. Suitable rosins and derivatives are gum rosin, tall oil rosin and wood rosin. Water-soluble gum rosin derivatives having a solubility of at least 3 g in 100 g water at 25° C. are particularly suitable.

In the context of the invention, "synthetic resins" are understood to be products which are formed by condensation or polymerization, are generally amorphous, do not have a clearly defined softening point and can vary from liquid to resin-like to solid in their aggregate state. Hydrocarbon resins, i.e. thermoplastic polymers having a lower average molecular weight of less than 2,000, are preferably used. Petroleum resins, coal tar resins and terpene resins may be used.

The alcohols are not only used as solubilizers, they are also crucial to the strength of the bond. Accordingly, they are preferably liquid and do not evaporate from the adhesive system at 25° C. Alcohols having a solubility of more than 3 g in 100 g water at 25° C. are preferably used. The alcohols may be aliphatic or cycloaliphatic, saturated or unsaturated hydrocarbons with a linear or branched chain. They may also contain further hetero atoms, for example O in the form of an ether group. Specific examples are methanol, ethanol, propanol, butanol, benzyl alcohol, cyclohexanol, di-, tri- and polyethylene glycol. Preferred alcohols are dihydric and polyhydric alcohols, more particularly ethane-1,2-diol, propane-1,2-diol and/or propane-1,2,3-triol.

The content of components A), B) and C) in the final adhesive may vary within wide limits. It is dependent not only on the content of the other components, but also by the application conditions and the concentrations of other additives. However, the content of glue-forming polymers in the final adhesive is advantageously 3 to 50% by weight and preferably 5 to 20% by weight; the content of rosin or synthetic resin or derivatives thereof is 3 to 75% by weight and preferably 5 to 50% by weight and the alcohol content is 3 to 50% by weight and preferably 5 to 25% by weight.

In addition to basic components A), B) and C), which largely determine the properties of the adhesive, the adhesive may contain additions to obtain special properties, for example with regard to viscosity, solubility, stability, processing properties, color, etc. Thus, benzoates, fluorides, such as sodium fluoride, amides and hydroxybenzoic acid esters, for example p-hydroxybenzoic acid methyl ester or butyl ester, are advantageously added as preservatives in quantities of 0.2 to 0.6% by weight. Suitable antifoam agents are stearates, silicone oil and adducts of ethylene oxide or propylene oxide with $C_{12-18}$ fatty alcohols in quantities of 0.3 to 2.5% by weight. The flow properties of the adhesive can be controlled in known manner by the addition of certain water-soluble low molecular weight liquifying agents, more particularly urea, thiourea and/or dicyanodiamide and also inorganic or organic salts, such as halides, nitrates, sulfates, etc. Substances such as these are best used in a concentration of 0 to 25% by weight and preferably in a concentration of 1 to 15% by weight. Other suitable additives are fragrances, dyes or fillers and also surfactants as wetting agents.

The total solids content of the adhesives according to the invention is in the range from 25 to 75% by weight and preferably in the range from 30 to 65% by weight, based on the final adhesive.

The adhesive according to the invention is prepared in known manner by mixing the components. The glue is best prepared first, preferably in accordance with DE 31 46 364, and subsequently mixed with an aqueous or alcoholic solution or dispersion of the rosin or its derivative and with the alcohol in a stirred mixer at 20° to 30° C. until a homogeneous dispersion is obtained. The additives are best incorporated in the glue. The final adhesive has a viscosity (Brookfield) typically in the range from 10,000 to 200,000 mPa.s and more particularly in the range from about 20,000 to 100,000 mPa.s at 25° C.

The adhesives according to the invention are particularly suitable for bonding paper, particularly paper labels, to plastic surfaces. Effective bonding presupposes adequate wetting of the plastic surface with the water-containing adhesive according to the invention. This is achieved in particular when the surface energy sigma is $\geqq 33$ $mJm^{-2}$, as measured in accordance with ASTM 2578-67. Thus, bonds of such high strength are obtained with polystyrene, polycarbonate, polyvinyl chloride, polyethylene terephthalate that paper labels tear on removal. However, the adhesive according to the invention may also be used for other plastics, for example for polyethylene or polypropylene. The articles to be bonded may consist entirely of plastic, for example plastic containers, such as bottles, cans, buckets, beakers, etc. However, they may also merely have a plastic surface, consisting for the rest of metal, glass or wood, for example tin cans, coated glass bottles, painted wood, etc.

In the convent of the invention, paper is understood to be a sheet-form material consisting essentially of fibers of predominantly vegetable origin which is obtained by dewatering a fibre suspension and then compressing and drying the paper web. The weight per unit area is generally up to 225 $g/m^2$, but may even be higher (paperboard and cardboard). The requirements which papers for paper labels have to satisfy are set out in the article by K. Dullinger (see the reference cited above). The paper may also be coated, for example with aluminium or a plastic film.

Using the adhesive according to the invention, paper can be bonded to non-pretreated plastics considerably better than with conventional glues based on starch, casein etc. The adhesive strength is increased to such an extent that labels tear on removal from plastic surfaces in exactly the same way as emulsion adhesives based on synthetic resins. This high strength had not been expected because components A), B) and C) do not lead to such strength levels either individually or in combinations of two. The strength levels mentioned are only achieved by combination of all three components. In addition, the adhesive according to the invention develops a wet adhesive strength which far exceeds the level of commercial dispersion adhesives.

The invention provides for the production of water-containing adhesives based on natural raw materials. Transparent adhesives may also be produced. They present no problems whatever in regard to storability and phase separation.

The invention is illustrated by the following Examples.

ADHESIVE I

55 Parts by weight of a casein adhesive, 35 parts by weight of a resin soap and 10 parts by weight of glycerol are mixed at room temperature for 15 minutes. The casein adhesive had a solids content of approximately 35% by weight and consisted essentially of 25% by weight of casein, approximately 8% by weight of urea and 2% by weight of sodium hydroxide in the form of a 35% solution. The remainder of 65% by weight was deionized water. The resin soap is a mixture of 50 parts by weight of gum rosin, 15 parts by weight KOH and 35 parts by weight of water. The adhesive was transparent, even in a layer thickness of 10 cm. It had a Brookfield viscosity of 30,000 mPa.s at 25° C.

ADHESIVE II

50 Parts by weight of casein adhesive, 30 parts by weight of resin soap (as above) and 20 parts by weight of ethylene glycol were mixed as described above. The adhesive was again transparent and had a Brookfield viscosity of 20,000 mPa.s at 25° C. (The papers used were papers cast-coated and coated on one side with a weight per unit area of approximately 70 to 90 $g/m^2$.)

ADHESIVE III

25 Parts by weight of casein adhesive, 34 parts by weight of WINGTACK 10, 36 parts by weight of rosin and 5 parts by weight of glycerol were mixed as in Example I. The adhesive was transparent and had a Brookfield viscosity of 40,000 mPa.s at 25° C. WINGTACK 10 is a commercial product of Goodyear. It consists of a mixture of terpene and petroleum resins and softens at 10° C. It has a viscosity of 20,000 to 40,000 cP at 25° C. and a molecular weight of 450.

BONDING

Superkote SK and Terroset paper labels (products of Feldmühle) were bonded to non-pretreated bottles of PVC, PET, PC and PS with adhesives I, II and III in accordance with VDI-Richtlinie 3821. To this end, the adhesive was first applied to the label in a layer thickness of approximately 100 μm. The label was then applied to the bottle under gentle pressure. After storage for 72 hours at 25° to 40° C., an attempt was made to remove the label from the bottle. The label tore in every case. The paper labels were made of paper cast-coated and coated on one side with a weight per unit area of approximately 70 to 90 g/m$^2$.

COMPARISON

If the labels are similarly bonded to the plastic bottles using the individual starting components, i.e. the casein adhesive, the resin soap and the glycerol, or a mixture of two of the starting components, namely casein adhesive/resin soap, casein adhesive/glycerol and resin soap/glycerol in a ratio by weight of 1:1, the label can readily be removed after drying. In some cases, the labels even drop off on their own.

We claim:

1. An adhesive composition consisting essentially of:

A) 3 to 50% by weight of a casein glue;

B) 3 to 75% by weight of at least one resin selected from the group consisting of rosin, rosin derivatives, and synthetic resins;

C) 3 to 50% by weight of an alcohol selected from the group consisting of monohydric alcohol, polyhydric alcohols and mixtures thereof;

D) water; and,

E) 0–25% by weight of adhesive additives.

2. A composition as claimed in claim 1 wherein said resin is selected from the group consisting of gum rosin, tall oil rosin and wood rosin.

3. A composition as claimed in claim 1 wherein said resin is a water-soluble rosin derivative having a water-solubility of at least 3 grams in 100 grams of water at 25° C.

4. A composition as claimed in claim 1 wherein said resin is a saponified rosin.

5. A composition as claimed in claim 1 wherein said resin is a saponified gum rosin having a water-solubility of at least 3 grams in 100 grams of water at 25° C.

6. A composition as claimed in claim 1 wherein said resin is selected from the group consisting of petroleum resins, coal tar resins and terpene resins.

7. A composition as claimed in claim 1 wherein said alcohol is selected from the group consisting of methanol, ethanol, propanol, butanol, benzyl alcohol, and cyclohexanol.

8. A composition as claimed in claim 1 wherein said alcohol is a dihydric or polyhydric alcohol.

9. A composition as claimed in claim 1 wherein said alcohol is selected from the group consisting of di-ethylene glycol, tri-ethylene glycol, and polyethylene glycol.

10. A composition as claimed in claim 1 wherein said alcohol is selected from the group consisting of ethane-1,2-diol, propane-1,2-diol and propane-1,2,3-triol and mixtures thereof.

11. A composition as claimed in claim 1 having a total solids content of 25 to 75% by weight.

12. A composition as claimed in claim 1 having a total solids content of 30 to 65% by weight.

13. A composition as claimed in claim 1 consisting essentially of:

A) 5 to 20% by weight of casein glue,

B) 5 to 50% by weight of said resin,

C) 5 to 25% by weight of said alcohol.

14. An adhesive composition of claim 1 consisting essentially of:

A) 3 to 50% by weight of casein glue,

B) 3 to 75% by weight of a resin having a water-solubility of at least 3 grams in 100 grams of water at 25° C. selected from the group consisting of saponified gum rosin, saponified tall oil rosin, and saponified wood rosin, C) 3 to 50% by weight of an alcohol selected from the group consisting of ethane-1,2-diol, propane-1,2-diol and propane-1,2,3-triol and mixtures thereof, and D) water, said composition having a total solids content of 25 to 75% by weight.

15. In a method of bonding paper to a plastic surface, the improvement comprising wetting the surface of plastic to be bonded to paper with the composition of claim 1.

16. A method as claimed in claim 15 wherein said plastic has a surface energy sigma of greater than or equal to 33 mJm$^{-2}$.

17. A method as claimed in claim 15 wherein said plastic is selected from the group consisting of polystyrene, polycarbonate, polyvinyl chloride, and polyethylene terephthalate.

18. A method as claimed in claim 15 wherein said composition consists essentially of:

A) 3 to 50% by weight of casein glue,

B) 3 to 75% by weight of said resin, and

C) 3 to 50% by weight of said alcohol.

19. A method as claimed in claim 15 wherein said composition consists essentially of:

A) 3 to 50% by weight of casein glue,

B) 3 to 75% by weight of a resin having a water-solubility of at least 3 grams in 100 grams of water at 25° C. selected from the group consisting of saponified gum rosin, saponified tall oil rosin, and saponified wood rosin, and C) 3 to 50% by weight of an alcohol selected from the group consisting of ethane-1,2-diol, propane-1,2-diol propane-1,2,3-triol and mixtures thereof, and D) water, said composition having a total solid content of 25 to 75% by weight.

* * * * *